United States Patent [19]

Moriarity et al.

[11] Patent Number: 5,202,383

[45] Date of Patent: Apr. 13, 1993

[54] HIGH THROW POWER ELECTRODEPOSITION SYSTEM

[75] Inventors: Thomas C. Moriarity, Wexford; Gregory J. McCollum, Gibsonia; Robert R. Zwack, Allison Park; Matthew S. Scott; Steven R. Zawacky, both of Pittsburgh, all of Pa.; Victor G. Corrigan, North Olmsted, Ohio

[73] Assignee: PPG Industries, Inc., Pittsburgh, Pa.

[21] Appl. No.: 732,534

[22] Filed: Jul. 19, 1991

[51] Int. Cl.$^5$ .............................................. C08L 75/04
[52] U.S. Cl. ................................. 525/124; 525/127; 525/440; 525/528; 204/181.7
[58] Field of Search .................. 204/181.7; 525/440, 525/528, 124, 127

[56] References Cited

U.S. PATENT DOCUMENTS

| | | |
|---|---|---|
| 3,984,299 | 10/1976 | Jerabek . |
| 4,225,478 | 9/1980 | Hicks . |
| 4,285,789 | 8/1981 | Kobayashi et al. ............. 204/181.7 |
| 4,296,010 | 10/1981 | Tominaga ....................... 204/181.7 |
| 4,435,559 | 3/1984 | Valko . |
| 4,622,369 | 11/1986 | Chang et al. ....................... 525/440 |
| 4,739,020 | 4/1988 | Carson et al. ...................... 525/528 |
| 4,748,200 | 5/1988 | Nasu . |
| 5,021,502 | 6/1991 | Patzschke et al. ................. 524/901 |

*Primary Examiner*—John Niebling
*Assistant Examiner*—Kishor Mayckar
*Attorney, Agent, or Firm*—Gary J. Connell; Dennis G. Millman

[57] ABSTRACT

A high throw power electrodeposition system with improved rupture voltage is disclosed. The electrodepositable coating includes an active hydrogen-containing ionic resin and a gamma hydroxy urethane curing agent, such as a curing agent having the structural feature:

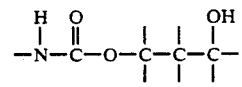

The gamma hydroxy urethane curing agent can be prepared by reacting a polyisocyanate with a 1,3-polyol, and in particular with 2,2,4-trimethylpentane-1,3-diol. The composition can also include a curing agent having an alkyl urethane structural feature which can be the reaction product of a polyisocyanate and a blocking agent which is a fatty alcohol. A method for coating a conductive substrate with the above-described composition is also disclosed. The method includes passing an electric current between the conductive substrate serving as a first anode and a second anode to deposit the composition and the conductive substrate.

14 Claims, No Drawings

HIGH THROW POWER ELECTRODEPOSITION SYSTEM

FIELD OF THE INVENTION

The present invention relates to electrodepositable coating compositions. More specifically, the present invention relates to a curing agent which provides a stable resin with a normal cure temperature and having high throw power and a high rupture voltage when electrodeposited.

BACKGROUND OF THE INVENTION

An important aspect of an electrodeposition coating system is its throw power. The term throw power refers to the ability to electrodeposit coatings in recessed areas of a work piece. A system which has the ability to coat highly recessed areas is said to have high throw power. High throw power systems are desirable because a work piece can be more completely coated. For example, in automotive applications, coating of interior surfaces of double walled work pieces is desirable for increased corrosion resistance. Similarly, in the electrodeposition of other industrial articles, such as heaters or radiators having multiple walls or panels, high throw power electrodeposition systems are necessary to provide more corrosion resistance.

It is known, for a given system, that throw power can be increased by the application of higher voltage. However, excessively high voltage will cause film ruptures. Thus, coatings which have a high rupture voltage are useful because higher throw power can be achieved while maintaining a smooth uniform film without ruptures. Throw power can also be affected by a higher conductivity of the electrodeposition bath. It is also generally recognized that higher molecular weight compositions tend to have higher throw power.

The present invention relates to the surprising finding that the use of gamma hydroxy urethane curing agents provide high throw power. A preferred embodiment of the gamma hydroxy urethane curing agent of the present invention is a reaction product of a polyisocyanate and a 1,3-polyol, wherein the ratio of isocyanate groups to hydroxyl groups from the 1,3-polyol is less than 1. The prior art discloses curing agents which are distinguishable from the curing agent of the present invention, but which are also formed from 1,3-polyols.

U.S. Pat. No. 4,225,478 (Hicks 1980) discusses the use of a blocked isocyanate made from polyphenyl isocyanate having an average functionality of 2.4 blocked with 0.8 equivalents of caprolactam and 0.3 equivalents of 2,2,4-trimethyl-1,3-pentanediol per isocyanate equivalent. Because the isocyanate groups are in excess, both hydroxyl groups on the 2,2,4-trimethyl 1,3-pentane diol will be reacted in such a formulation. Examples 9 and 10 in U.S. Pat. No. 4,134,864 (Belanger 1979) and examples 8 and 9 of U.S. Pat. No. 4,139,510 (Anderson 1979) disclose similar uses of 2,2,4-trimethyl-1,3-pentanediol.

U.S. Pat. No. 4,748,200 (Nasu 1988) discloses the use of a thermosetting resin which contains α,α,α',α'-tetramethylxylene diisocyanate (TMXDI) and a prepolymer of TMXDI in which the isocyanate groups are reacted with an active hydrogen-containing compound. 2,2,4-trimethyl-1,3-pentanediol is disclosed as one optional active hydrogen-containing compound. When reacted together as taught in Nasu, however, the isocyanate groups are in excess over the active hydrogens of the active hydrogen-containing compounds. Therefore, both hydroxyl groups of the diol will be reacted with isocyante groups.

Compounds which are structurally similar to the gamma hydroxy urethane of the present invention are also known. For example, U.S. Pat. No. 4,435,559 (Valko 1984) discloses a beta hydroxy urethane curing agent which is effective at low temperatures. Such compositions, however, do not provide the surprising effect of increased throw power as compounds of the present invention do.

It has been observed that some blocked isocyanate containing electrodeposition baths have high throw power at very high resin particle sizes. However, this approach is not commercially useful because at higher particle size, resins tend to be unstable either upon standing or under shearing conditions. Another disadvantage with some of such known blocking agents, such as higher aliphatic blocking agents, is an unacceptably high cure temperature of up to between 360° F. and 400° F.

SUMMARY OF THE INVENTION

The present invention is directed toward a stable electrodepositable composition which includes an active hydrogen-containing ionic resin and a gamma hydroxy urethane curing agent, such as a curing agent containing the structural feature:

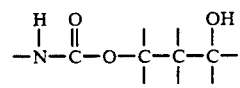

The gamma hydroxy urethane curing agent is preferably the reaction product of a polyisocyanate and a blocking agent which is a 1,3-polyol with the equivalent ratio of isocyanate groups to hydroxyl groups from the 1,3-polyol being less than 1. Further, the 1,3-polyol can be selected from the group consisting of 2,2,4-trimethylpentane-1,3-diol; 1,3-butanediol; neopentyl glycol; 2-ethyl-2-butyl-1,3-propanediol; and mixtures thereof. The curing agent can also have an alkyl urethane structural feature. Such a curing agent can be the reaction product of a polyisocyanate and a blocking agent which is a fatty alcohol and preferably is tridecyl alcohol.

A further embodiment of the invention is directed toward a method for coating a conductive substrate serving as a first electrode in an electrical circuit in which the electrical circuit includes the first electrode and a second electrode which are immersed in an aqueous ionic electrocoating composition. The process includes passing an electric current between the first and second electrodes to cause the electrocoating composition to deposit on the first electrode. In this method, the composition comprises an active hydrogen-containing ionic resin and a gamma hydroxy urethane curing agent. In a preferred embodiment in this aspect of the invention, the first electrode is a cathode, the second electrode is an anode and the ionic resin is a cationic resin.

DETAILED DESCRIPTION OF THE INVENTION

It has been found that use of a gamma hydroxy urethane curing agent in accordance with the present invention in an electrodeposition system yields surprisingly high throw power. As used herein, the term "throw power" generally refers to the ability of an electrodepositable composition to be deposited in recessed areas of a substrate. More particularly, the term refers to measurements of throw power by various standard tests. Such tests include, for example, the European throwpower test discussed in the Examples below, the Ford cell test and the General Motors cell test. See, for example, Brewer et al, JOURNAL OF PAINT TECHNOLOGY, 41 No. 535, pp. 461–471 (1969); and Gilchrist et al, American Chemical Society, Division of Organic Coatings and Plastics Chemistry, Preprint Book No. 31, No. 1, pp. 346–356, Los Angeles meeting, March–April 1971.

The ionic active hydrogen-containing resins of the present electrodepositable composition include both anionic resins and cationic resins with the cationic resins being preferred because of the superior corrosion resistance attainable with such resins. The ionic resins should contain active hydrogens, such as those provided by hydroxyl, primary amino, secondary amino and thiol, including mixtures thereof. The active hydrogens are reactive with capped polyisocyanates resulting in a curing reaction when the coatings are heated. Illustrative examples of the ionic active hydrogen-containing resins are polymers which are derived from epoxy polymers, acrylic polymers, polyesters, and the like, which contain ionic groups and active hydrogen groups. Particularly preferred ionic group- and active hydrogen group-containing resins are cationic resins which contain amine salt groups such as the acid-solubilized reaction products of polyepoxides and primary or secondary amines as described in U.S. Pat. No. 4,031,050 to Jerabek and U.S. Pat. No. 3,922,253 to Jerabek et al.

Besides amine salt group-containing resins, quaternary ammonium salt group-containing resins can also be employed. Examples of these resins are those which are formed from reacting an organic polyepoxide with a tertiary amine acid salt. Such resins are described in U.S. Pat. No. 4,101,486 to Bosso et al. Examples of other cationic resins are ternary sulfonium salt group-containing resins such as those described in U.S. Pat. No. 4,038,232 to Bosso et al.

Specially modified cationic resins such as those containing primary amine groups formed from reacting the polyepoxides with diketimines containing at least one secondary amine group, for example, the methyl isobutyl diketimine of diethylenetriamine, can also be used and in fact their use is preferred. Such resins are described in U.S. Pat. No. 4,017,438 to Jerabek et al.

Modified resins such as those obtained by chain extending the polyepoxide to increase its molecular weight are also preferred in the practice of the invention. Such materials are described in U.S. Pat. No. 4,148,772 to Jerabek et al in which the polyepoxide is chain extended with a polyester polyol and in U.S. Pat. No. 4,468,307 to Wismer et al. in which the polyepoxide is chain extended with a particular polyether polyol. Also, chain extension such as disclosed in Canadian Patent 1,179,443 can be used.

The epoxy polymers which are used in preparing the cationic resins are polyepoxides, that is, polymers having a 1,2-epoxy equivalency greater than 1, preferably about 2 or more. Preferred are polyepoxides which are difunctional with regard to epoxy. The preferred polyepoxides are polyglycidyl ethers of cyclic polyols. Particularly preferred are polyglycidyl ethers of polyphenols such as bisphenol A.

Besides the polyglycidyl ethers of polyphenols, epoxy-containing polymers which can be used are acrylic polymers which contain epoxy groups. These polymers are formed by polymerizing an unsaturated epoxy group-containing monomer such as glycidyl acrylate or glycidyl methacrylate with one or more polymerizable ethylenically unsaturated monomers. Examples of these polymers are described in U.S. Pat. No. 4,001,156, column 3, line 59, to column 5, line 60, the portions of which are hereby incorporated by reference.

Examples of amines which can be used in preparing the polyepoxide-amine reaction products are ammonia, primary, secondary and tertiary amines and mixtures thereof. The reaction product of the polyepoxides and the amines is at least partially neutralized with an acid to form a polymeric product containing amine salt and/or a quaternary ammonium salt group. Reaction conditions of polyepoxides with amines, examples of various amines and at least partial neutralization with acid are disclosed in U.S. Pat. No. 4,260,720, column 5, line 20, to column 7, line 4, the portions of which are hereby incorporated by reference.

With regard to the amount of organic amine and polyepoxide which are reacted with one another, the relative amounts depend on the extent of cationic base such as cationic salt group formation desired and this in turn will depend upon the molecular weight of the polymer. The extent of cationic salt group formation and the molecular weight of the reaction product should be selected such that when the resultant cationic polymer is mixed with aqueous medium, a stable dispersion will form. A stable dispersion is one which does not settle or is one which is easily dispersible if sedimentation occurs. In some embodiments, the dispersion should additionally be of sufficient cationic character that the dispersed polymer particles will migrate towards the cathode when an electrical potential is impressed between an anode and a cathode immersed in the aqueous dispersion.

Also, the molecular weight, structure and extent of cationic salt group formation should be controlled such that the dispersed polymer will have the required flow to form a film on the substrate, and in the case of electrodeposition, to form a film on the cathode. The film should be insensitive to moisture to the extent that it will not redissolve in the electrodeposition bath or be rinsed away from the coated surface after removal from the bath. In general, the cationic polymers useful in the practice of the invention will have average molecular weights (Mw) as determined by gel permeation chromatography using a polystyrene standard of less than 100,000, more preferably less than 75,000, and most preferably less than 50,000. The minimum molecular weight is about 500.

The cationic polymers usually contain from 0.01 to 10, preferably from about 0.1 to 5.0, more preferably from about 0.3 to 3.0 milliequivalents of basic group, for example, cationic group, per gram of resin solids. Obviously, one must use the skill of the art to couple the molecular weight with the cationic group content to arrive at a satisfactory product. The polyglycidyl ethers will have molecular weights of about 500 to 10,000, preferably 1000 to 5000. Acrylic polymers, on the other hand, will have molecular weights as high as 100,000, preferably 5000 to 50,000.

The active hydrogens associated with the cationic resins of the invention can be selected from any of the active hydrogens which are reactive with isocyanates over the temperature range of 200°–400° F. (93°–204° C.), preferably 250°–350° F. (121°–177° C.). Typically, the active hydrogens will be those associated with hydroxyl, primary and secondary amino and thiol, including mixed groups such as hydroxyl and primary amino.

Besides cationic resins, the ionic resin can be an anionic resin. Such resins suitable for use in electrodeposition are described in U.S. Pat. Nos. 3,366,563; 3,369,983; 3,403,088; 3,530,054; 3,565,781 and 3,772,227.

The gamma hydroxy urethane curing agent of the present invention typically has the following structural feature:

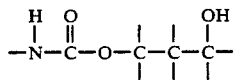

The curing agent can be prepared by reacting a polyisocyanate with a 1,3-polyol wherein the equivalent ratio of isocyanate groups to hydroxyl groups from the 1,3-polyol is less than 1. More preferably, the equivalent ratio of isocyanate groups to hydroxyl groups from the 1,3-polyol is from 1:1.5 to 1:2.0.

In a preferred embodiment, the hydroxyl groups on the 1,3-polyol have different reactivities and the gamma hydroxy urethane is prepared by reaction of the polyisocyanate with the 1,3-polyol such that there is a stoichiometric excess of hydroxyl groups from the 1,3-polyol to isocyanate groups and such that the less reactive hydroxyl group of the 1,3-polyol is substantially unreacted. For example, when the 1,3-polyol has a primary hydroxyl group and a secondary hydroxyl group, the secondary hydroxyl group is generally less reactive than the primary hydroxyl. In this instance, a sufficient excess of the 1,3-polyol would allow the secondary hydroxyl to remain substantially unreacted. The term "substantially unreacted" as used herein, refers to a reaction product in which less than about 80 percent of the less reactive hydroxyl groups of the 1,3-polyol are reacted, more preferably less than about 50 percent and most preferably less than about 30 percent. The term "substantially unreacted" further refers to a reaction product in which a portion of the less reactive hydroxyl groups are unreacted such that the resulting product has no commercially significant difference in throw power, as compared with a reaction product having less than about 80 percent of the less reactive hydroxyl groups being reacted.

In preparation of the gamma hydroxy urethane of the present invention by reaction of a polyisocyanate with a 1,3-polyol, as discussed above, it is preferred that hydroxyl groups from the 1,3-polyol be in excess with respect to isocyanate groups. Further, it is preferred that the polyisocyanate be added to the 1,3-polyol, rather than adding the 1,3-polyol to the polyisocyanate, in a manner so that if the hydroxyl groups have different reactivity, the less reactive hydroxyl of the 1,3-polyol remains substantially unreacted. Without intending to be bound by theory, in embodiments of the present invention in which the 1,3-polyol has a primary hydroxyl and a secondary hydroxyl, the primary hydroxyl group on 1,3-polyol is typically significantly more reactive than the secondary group. Therefore, in this instance, if the polyisocyanate is added to the 1,3-polyol, the primary hydroxyl groups of the 1,3-polyol will react before the secondary hydroxyl groups. Further, the polyisocyanate is preferably added slowly to the 1,3-polyol, particularly in production scale operations, to control heat generated by the reaction. Typically, the isocyanate is added to the 1,3-polyol over at least about 30 minutes, more preferably over at least about 1 hour, and most preferably over at least about 3 hours.

The reaction between a polyisocyanate and a 1,3-polyol to produce a gamma hydroxy urethane is typically conducted at a temperature of less than about 110° C., more preferably between about 60° C. and 100° C. In any event, in the instance of a polyol having hydroxyl groups with different reactivities, the reaction is conducted below a temperature at which selectivity of isocyanate groups for the more reactive hydroxyl groups is lost.

The gamma hydroxy urethane curing agent can be either external or internal to the active hydrogen-containing material. As used herein, the term "external" means that the gamma hydroxy urethane curing agent does not constitute an integral part of the active hydrogen-containing ionic resin. As used herein, the term "internal" means the gamma hydroxy urethane curing agent is an integral part of the active hydrogen-containing material. An external curing agent is also commonly known as a fully blocked curing agent which refers to a curing agent derived from, e.g. a diisocyanate, on which all reactive isocyanate sites are "blocked" by a temperature sensitive blocking agent or other similar blocking agent. Such curing agents, therefore, cannot react at a significant rate with the active hydrogen-containing material in the absence of heat. An external curing agent of the present invention contains at least one gamma hydroxy urethane functional group with all other isocyanate groups on the curing agent blocked by either a gamma hydroxy urethane functional group or some conventional blocking agent.

The conventional blocking agent in accordance with this invention can be an aliphatic, a cycloaliphatic or an aromatic alkyl monoalcohol, for example, lower aliphatic alcohols, such as methyl, ethyl, propyl, butyl, amyl, hexyl, heptyl, octyl, nonyl, 3,3,5-trimethylhexyl, decyl and lauryl alcohols and the like; cycloaliphatic alcohols such as cyclopentanol and cyclohexanol and aromatic alkyl such as benzyl alcohol. Oximes such as methyl ethyl ketoxime and lactams such as epsilon-caprolactam can also be used.

In addition to a fully blocked external curing agent, the curing agent can be internal or partially blocked. A partially blocked curing agent can be prepared by, e.g., reacting a diisocyanate having one sterically hindered isocyanate group with a 1,3-polyol such that the non-hindered isocyanate group reacts mainly with one hydroxyl of the 1,3-polyol and the other hydroxyl is considerably less reacted. Such a curing agent can be incorporated into the ionic active hydrogen-containing resin by reacting the sterically hindered isocyanate with an active hydrogen of the resin. Alternatively, a diisocyanate can be reacted with an epoxy resin backbone at one isocyanate functionality and subsequently the second isocyanate functionality can be blocked by a 1,3-polyol.

The 1,3-polyol of the present invention can be any 1,3-polyol. More preferably, the 1,3-polyol of the present invention is a 1,3-diol and includes, but is not limited to, 2,2,4-trimethylpentane-1,3-diol; 1,3-butane-diol; neopentyl glycol; 2-ethyl 2-butyl-1,3-propanediol; and mixtures thereof. More preferably, the 1,3-polyol is 2,2,4-trimethylpentane-1,3-diol.

The polyisocyanates of the present invention for preparing the gamma hydroxy urethane curing agent can be aliphatic or aromatic isocyanates, with the aromatic isocyanates being preferred. Representative examples are the aliphatic isocyanates such as trimethylene, tetramethylene, pentamethylene, hexamethylene, 1,2-propylene, 1,2-butylene, 2,3-butylene, and 1,3-butylene diisocyanates; the cycloalkylene compounds such as 1,3-cyclopentane, 1,4-cyclohexane, 1,2-cyclohexane diisocyanates and isophorone diisocyanates; the aromatic compounds such as m-phenylene, p-phenylene, 4,4'-diphenyl, 1,5-naphthalene and 1,4-naphthalene diisocyanates and diphenylmethane-4,4'-diisocyanate (MDI) and polymeric diphenylmethane diisocyanates; the aliphatic-aromatic compounds such as 2,4- or 2,6-tolylene, or mixtures thereof, 4,4'-toluidine, and 1,4-xylylene diisocyanates; the nuclear-substituted aromatic compounds such as dianisidine diisocyanate, 4,4'-diphenylether diisocyanate and chlorodiphenylene diisocyanate; the triisocyanates such as triphenylmethane-4,4',4"-triisocyanate, 1,3,5-triisocyanatobenzene and 2,4,6-triisocyanatotoluene; and the tetraisocyanates such as 4,4'-dimethyldiphenylmethane-2,2',5,5'-tetraisocyanate; the polymerized polyisocyanates such as tolylene diisocyanate dimers and trimers, and the like.

In addition, the organic polyisocyanates can be a prepolymer derived from a polyol including polyether polyol or polyester polyol, including polyols which are reacted with excess polyisocyanates to form isocyanate-terminated prepolymers. These may be simple polyols such as glycols, e.g., ethylene glycol and propylene glycol, as well as other polyols such as glycerol, trimethylolpropane, hexanetriol, pentaerythritol, and the like, as well as ether-alcohols such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolthane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

A catalyst can be used in preparing the gamma hydroxy urethane when prepared by the reaction of a polyisocyanate with a 1,3-polyol if necessary to achieve complete reaction of isocyanate groups. Catalysts useful herein are those suitable for urethane formation. They are, preferably, metal salts or complexes, for example, lead acetate, dibutyltin dilaurate, stannous octoate and the like. Other catalysts for urethane formation may also be employed.

A solvent is usually employed in preparing the gamma hydroxy urethane. Solvents that are non-reactive with isocyanates are preferred, e.g., ketones, e.g., methyl isobutyl ketone, ethers such as diethyl ether of ethylene glycols, or esters such as ethyl acetate.

In addition to preparation of the gamma hydroxy urethane of the present invention by reaction of a polyisocyanate and a 1,3-polyol, other reaction schemes can be used to prepare gamma hydroxy urethane curing agents. For example, a gamma hydroxy urethane curing agent can also be prepared by reacting a six membered cyclic carbonate, such as 1,3-propane diol cyclocarbonate, with an amine and preferably, an aliphatic amine, such as isophorone diamine or diethylene triamine.

As noted above, some known approaches to achieve high throwpower are at the expense of dispersion stability because resin particle size in the dispersion increases to a degree that the dispersion is unstable. The gamma hydroxy urethane of the present invention, however, achieves high throwpower, without significantly affecting particle size and stability. More specifically, the resin particle size of a dispersion prepared in accordance with the present invention is typically less than about 2000 Å, more preferably between about 1000 Å, and most preferably between about 1100 Å and about 1700 Å.

The electrodepositable composition, including an active hydrogen-containing ionic resin and a gamma hydroxy urethane curing agent, can also include a curing agent having the following alkyl urethane structural feature:

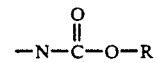

wherein R is an alkyl group of greater than 8 carbon atoms, and more preferably, R is an alkyl group of 13 or greater carbon atoms. R is also preferably a branched chain, but it can also be straight. The curing agent having an alkyl urethane structural feature can either be the gamma hydroxy urethane curing agent or a separately prepared curing agent.

It has been surprisingly found that use of a curing agent having the above-identified alkyl urethane structural feature in accordance with the present invention provides an electrodepositable composition with improved rupture voltage. It is well known that all electrodepositable compositions have a maximum voltage at which they can be successfully applied and above which the film ruptures, causing unsightly blemishes and lowered corrosion properties. As used herein, the term rupture voltage refers to a voltage at which such rupture occurs. It is generally recognized that untreated bare steel is difficult to coat by electrodeposition because coatings tend to have low rupture voltage over bare steel. In particular, it has been found that coatings having a gamma hydroxy urethane curing agent as described above tend to have lower rupture voltages over bare steel and that the rupture voltage can be significantly increased by use of an alkyl urethane curing agent as described herein.

The above-described alkyl urethane curing agent is preferably a reaction product of a polyisocyanate and a blocking agent which is a fatty alcohol. As noted above, the alkyl urethane curing agent can be the same as or different from the gamma hydroxy urethane curing agent. In the former instance, the curing agent can be a reaction product between a polyisocyanate, a fatty alcohol, and a 1,3-polyol. In the latter, the reaction mixture of a polyisocyanate and a fatty alcohol does not include a 1,3-polyol. The fatty alcohol useful in preparing the above-identified alkyl urethane curing agent can be further characterized as preferably being a primary alcohol, although it can also be secondary or tertiary. The fatty alcohol typically has from 8 to 20 or more carbon atoms. Additionally, the fatty alcohol is preferably a monoalcohol, but it can also be a diol, triol or higher order alcohol. The fatty alcohol is also preferably a branched chain alcohol but it can be straight.

The fatty alcohol useful in preparing the alkyl urethane curing agent of the present invention is typically selected from primary and/or secondary alcohol, such as n-octyl alcohol, n-decyl alcohol, dodecyl alcohol, tridecyl alcohol, myristyl alcohol, sec-octyl alcohol and stearyl alcohol. More preferably, the fatty alcohol is tridecyl alcohol.

The fatty alcohol is reacted with a polyisocyanate to form a curing agent. The polyisocyanate is as described above for use in preparing a gamma hydroxy urethane curing agent. The alkyl urethane curing agent is used in conjunction with another curing agent, such as a gamma hydroxy urethane curing agent or a curing agent blocked with a conventional blocking agent. When used in conjunction with another curing agent, the ratio of alkyl urethane curing agent to the other curing agent is typically from 1:1 to 1:19, more preferably from 1:3 to 1:19 and most preferably from 1:4 to 1:9.

As discussed above with regard to gamma hydroxy urethane curing agents, the alkyl urethane curing agent can be either fully blocked or partially blocked. A partially blocked alkyl urethane curing agent can be prepared by reacting a polyisocyanate with a fatty alcohol with an excess of isocyanate functionality.

As set forth herein, the electrodepositable composition, including an active hydrogen-containing resin can also include a cure catalyst. Typically, the cure catalyst is a metal salt and/or complex of a metal such as lead, zinc, iron, tin and manganese. Suitable salts of these metals are, for example, octoates and naphthanates. A suitable complex is, for example, acetyl acetonate. The cure catalyst is used in amounts sufficient to effect cure at the temperatures employed in the cure process. For example, the metal salt and/or complex is employed as a cure catalyst in amounts of about 0.1 to 5.0, preferably 0.5 to 3.0 percent metal by weight (solids) based on the weight of the electrodepositable composition. The cure catalyst can be mixed simultaneously with other starting materials for the preparation of the composition, or introduced into the composition in any order that is convenient.

In the practice of the invention, the electrodepositable composition is a water-based composition particularly suited to application by electrodeposition as an aqueous dispersion. The term "dispersion" as used herein, is intended to cover solutions and colloidal suspensions, as well. Generally, the aqueous dispersion contains from about 1% to about 80% by weight resin and more preferably from about 5% to about 20% by weight resin. Of the resin solids, the curing agent, particularly the gamma hydroxy urethane or mixture of gamma hydroxy urethane and alkyl urethane curing agent, comprises between about 20 and about 60 percent by weight, preferably between about 30 and about 50 percent by weight, and more preferably between about 35 and about 45 percent by weight.

In most instances, a pigment composition and, if desired, various additives such as anti-oxidants, surface active agents, coupling solvents and the like known in the electrodeposition art are included. The pigment composition may be of any conventional type, comprising, for example, one or more pigments such as iron oxides, lead oxides, strontium chromate, carbon black, titanium dioxide, talc, barium sulfate, cadmium yellow, cadmium red, chromic yellow, or the like.

In electrodeposition processes employing the composition of the present invention, the composition is placed in contact with an electrically conductive anode and an electrically conductive cathode. If the active hydrogen group-containing resin is dispersed with a cationic group, the surface to be coated is the cathode. If the active hydrogen group-containing resin is dispersed with an anionic group, the surface to be coated is the anode. Upon passage of electric current between the anode and the cathode, while in contact with the bath containing the composition, an adherent film of the composition is deposited on the surface to be coated. In the present invention, the resin is preferably a cationic resin.

The conditions under which the electrodeposition is carried out are, in general, those used in electrodeposition of other types of coatings. The applied voltage may be varied greatly and can be, for example, as low as one volt or as high as several thousand volts, although typically between 50 volts and 500 volts. The current density is usually between about 1.0 ampere and 15 amperes per square foot, and tends to decrease during electrodeposition. The method of the invention is applicable to the coating of any electrically conductive substrate, and especially metals such as steel, aluminum, copper or the like.

After deposition, the coating is cured at elevated temperatures by any convenient method such as in baking ovens or with banks of infrared heat lamps. Cure is obtained at conventional temperatures and times while achieving high throw power. Specifically, cure is obtained at temperatures of less than about 360° F. for about 30 minutes and more specifically at temperatures of between about 325° F. and 350° F. for about 30 minutes.

The following examples are provided for the purpose of illustration of the present invention and are not intended to limit the scope of the invention, as claimed below.

EXAMPLE A

This example shows the preparation of crosslinker A, an isocyanate crosslinker capped with a 1,3-polyol, used in preparation of cationic electrodeposition bath A described below. Crosslinker A was prepared from the following mixture of ingredients:

| Ingredients | Weight (grams) | Equivalents |
|---|---|---|
| (1) 2,2,4-trimethylpentane-1,3-diol(TMPD) | 1024.1 | 7.00 |
| (2) trimethylol propane | 134.3 | 3.00 |
| (3) methylisobutyl ketone | 700.3 | |
| (4) MDI | 1320.0 | 10.00 |
| (5) methylisobutyl ketone | 126.0 | |
| (6) dibutyltin dilaurate | (0.5) | |
| Total | 3304.7 | |

Ingredients (1), (2) and (3) are charged to a five liter flask under nitrogen atmosphere. Ingredient (4) is added over approximately one hour, while maintaining the temperature below 95° C. The remainder of (4) is rinsed with ingredient (5). The mixture is held at 95° C. until no isocyanate is detected by IR spectroscopy. If isocyanate persists after two hours, ingredient (6) is added. The theoretical solids content is 75%.

EXAMPLE B

This example shows the preparation of crosslinker B, an isocyanate crosslinker capped with a 1,3-polyol, used in preparation of cationic electrodeposition bath B described below. Crosslinker B was prepared from the following mixture of ingredients:

| Ingredients | Weight (grams) | Equivalents |
|---|---|---|
| (1) neopentyl glycol(NPG) | 728.0 | 7.0 |
| (2) trimethylol propane | 134.3 | 3.0 |
| (3) methylisobutyl ketone | | |
| (4) MDI | 1320.0 | 10.0 |
| (5) methylisobutyl ketone | 126.0 | |
| (6) dibutyltin dilaurate | (0.5) | |
| Total | 2308.3 | |

Ingredients (1), (2) and (3) are charged to a five liter flask under nitrogen atmosphere. Ingredient (4) is added over approximately one hour, while maintaining the temperature below 95° C. The remainder of (4) is rinsed with ingredient (5). The mixture is held at 95° C. until no isocyanate is detected by IR spectroscopy. If isocyanate persists after two hours, ingredient (6) is added. The theoretical solids content is 75%.

EXAMPLE C

This example shows the preparation of crosslinker C, an isocyanate crosslinker capped with a 1,3-polyol and a fatty alcohol, used in preparation of cationic electrodeposition bath C described below. Crosslinker C was prepared from the following mixture of ingredients:

| Ingredients | Weight (grams) | Equivalents |
|---|---|---|
| (1) 2,2,4-trimethylpentane-1,3-diol | 862.3 | 5.9 |
| (2) trimethylol propane | 134.3 | 3.0 |
| (3) tridecyl alcohol | 220.0 | 1.1 |
| (4) methylisobutyl ketone | 700.3 | |
| (5) MDI | 1320.0 | 10.0 |
| (6) methylisobutyl ketone | 126.0 | |
| (7) dibutyltin dilaurate | (0.5) | |
| Total | 3362.9 | |

Ingredients (1), (2), (3) and (4) are charged to a five liter flask under nitrogen atmosphere. Ingredient (5) is added over approximately one hour, while maintaining the temperature below 95° C. The remainder of (5) is rinsed with ingredient (6). The mixture is held at 95° C. until no isocyanate is detected by IR spectroscopy. If isocyanate persists after two hours, ingredient (7) is added. The theoretical solids content is 75%.

EXAMPLE D

This example shows the preparation of crosslinker D, an isocyanate crosslinker capped with a 1,3-polyol and a fatty alcohol, used in preparation of cationic electrodeposition bath D described below. Crosslinker D was prepared from the following mixture of ingredients:

| Ingredients | Weight (grams) | Equivalents |
|---|---|---|
| (1) 2,2,4-trimethylpentane-1,3-diol | 511.7 | 3.5 |
| (2) trimethylol propane | 134.3 | 3.0 |
| (3) tridecyl alcohol | 700.0 | 3.5 |
| (4) methylisobutyl ketone | 700.3 | |
| (5) MDI | 1320.0 | 10.0 |
| (6) methylisobutyl ketone | 126.0 | |
| (7) dibutyltin dilaurate | (0.5) | |
| Total | 3492.3 | |

Ingredients (1), (2), (3) and (4) are charged to a five liter flask under nitrogen atmosphere. Ingredient (5) is added over approximately one hour, while maintaining the temperature below 95° C. The remainder of (5) is rinsed with ingredient (6). The mixture is held at 95° C. until no isocyanate is detected by IR spectroscopy. If isocyanate persists after two hours, ingredient (7) is added. The theoretical solids content is 75%.

COMPARATIVE EXAMPLE E

This example shows the preparation of a comparative crosslinker E, an isocyanate crosslinker capped with a standard capping agent, used in preparation of cationic electrodeposition bath E described below. Crosslinker E was prepared from the following mixture of ingredients:

| Ingredients | Weight (grams) | Equivalents |
|---|---|---|
| (1) butyl carbitol | 1135.6 | 7.0 |
| (2) trimethylol propane | 134.3 | 3.0 |
| (3) methylisobutyl ketone | 700.3 | |
| (4) MDI | 1320.0 | 10.0 |
| (5) methylisobutyl ketone | 126.0 | |
| (6) dibutyltin dilaurate | (0.5) | |
| Total | 3416.2 | |

Ingredients (1), (2) and (3) are charged to a five liter flask under nitrogen atmosphere. Ingredient (4) is added over approximately one hour, while maintaining the temperature below 95° C. The remainder of (4) is rinsed with ingredient (5). The mixture is held at 95° C. until no isocyanate is detected by IR spectroscopy. If isocyanate persists after two hours, ingredient (6) is added. The theoretical solids content is 75%.

EXAMPLE I

This example shows the preparation of the cationic electrodeposition binder used in the formulation of the cationic electrodepositable baths A-E described below using crosslinkers A-E. The binder was prepared from the following mixture of ingredients:

| Ingredients | Parts by Weight (grams) |
|---|---|
| EPON 828[1] | 1023.0 |
| Bisphenol A-ethylene oxide adduct (1/6 molar ratio) | 365.0 |
| Bisphenol A | 297.0 |
| Methyl isobutyl ketone | 88.7 |
| Benzyldimethylamine | 1.4 |
| Benzyldimethylamine | 3.8 |
| Crosslinker | 2041.2 |
| Diketimine[2] | 113.7 |
| N-methylethanolamine | 98.6 |
| Sulfamic Acid | 108.2 |
| Deionized Water | 2232.8 |

-continued

| Ingredients | Parts by Weight (grams) |
| --- | --- |
| Deionized Water | 3642.0 |

[1]Bisphenol A diglycidlyl ether available from Shell Corporation.
[2]Diketimine derived from diethylene triamine and methyl isobutyl ketone (73 percent solids in methyl isobutyl ketone)

The EPON 828, bisphenol A-ethylene oxide adduct, bisphenol A and methyl isobutyl ketone were charged into a reaction vessel and heated under a nitrogen atmosphere to 140° C. The first portion of the benzyldimethylamine was added and the reaction mixture allowed to exotherm to about 185° C. and refluxed to remove azeotropically any water present. The reaction mixture was cooled to 160° C., held for one half hour, cooled further to 145° C. and the second portion of benzyldimethylamine added. The reaction was held at 145° C. until an epoxy equivalent weight on solids of 1060 is obtained. The reaction mixture was then cooled to about 100° C. via the addition of the crosslinker and the diketimine and the N-methylethanolamine were added in succession. The mixture was allowed to exotherm to about 115° C. and a temperature of 125° C. was established. At the end of an hour hold at 125° C., the resin was dispersed in an aqueous medium consisting of the sulfamic acid and the first portion of deionized water. The dispersion was then further thinned with the second portion of deionized water first to 45% solids and then to 35% solids. The dispersion was then diluted with 1112 parts of deionized water and stripped of methyl isobutyl ketone by removing 1112 parts of distillate under vacuum at 60° C. The stripped dispersion has a solids content of 35% and a particle size of about 1200 Å.

EXAMPLE II

This example shows the preparation of the cationic electrodeposition resins used in the formulation of the cationic electrodeposition baths A-E described below. The resin was prepared from the following mixture of ingredients:

| Ingredients | Weight (grams) | Solids (grams) |
| --- | --- | --- |
| A. Resin binders of Example I | 3493.8 | 1397.5 |
| B. Adduct of a polyoxypropylene diamine[1] and EPON 1001[2] | 217.1 | 76.0 |
| C. Adduct of butyl carbitol and formaldehyde | 51.8 | 45.6 |
| D. Deionized Water | 37.3 | |
| Total | 3800 | 1520 |

[1]polyoxypropylene diamine available from Texaco Chemical Co. as Jeffamine D-2000.
[2]bisphenol A epichlorohydrin-type epoxy resin available from Shell having an epoxy equivalent weight of 500.

Charges B and C are pre-mixed and the premixture is slowly reduced with small portions of D until viscosity is below 1000 cps. The reduced premixture is added to A and agitated for 1 hour.

EXAMPLE III

This example shows the preparation of the pigment paste formulation used in the formulation of the cationic electrodeposition baths A-H described below. The pigment paste formulation was prepared from the following mixture of ingredients:

| Ingredients | Weight (grams) | Resin Solids (grams) | Pigment Solids (grams) |
| --- | --- | --- | --- |
| Pigment Grinding Vehicle[1] | 1802.0 | 1000.0 | — |
| TiO$_2$[2] | 3500.0 | — | 3500.0 |
| Clay[3] | 1500.0 | — | 1500.0 |
| Deionized Water | 2977.0 | — | — |
| Total | 9779.0 | 1000.0 | 5000.0 |

[1]Preparation of the pigment grinding vehicle is described in U.S. Pat. No. 4,423,166, column 16, lines 21–49.
[2]Available as TIPURE R 900 from DuPont.
[3]Available as ASP 200 from Englehardt.

All ingredients are pre-mixed under agitation and then sand milled to 7+ Hegmann grind.

EXAMPLE IV

This example shows the preparation of the paint formulations used in the formulation of cationic electrodeposition baths A-E. The paint formulations were prepared from the following mixture of ingredients:

| Ingredients | Weight (grams) | Resin Solids (grams) | Pigment Solids (grams) |
| --- | --- | --- | --- |
| Resins of Example II | 1502.0 | 600.8 | — |
| Pigment Paste of Example III | 377.5 | 38.5 | 192.9 |
| Tin Catalyst[1] | 29.4 | 3.8 | — |
| Deionized Water | 1891.1 | — | — |
| Total | 3800.0 | 643.1 | 192.9 |

[1]Prepared dispersion of the pigment grinding vehicle described in Example III and dibutyl tin oxide.

All ingredients are mixed under agitation.

EXAMPLE V

Electrodeposition baths A-E were prepared as described above and tested in a European Throwpower test. The test is conducted on an assembly of two aligned panels of iron phosphated cold rolled steel which are 4 inches by 12 inches. The panels are separated by placing a ⅜ inch by 12 inch plastic shim between the panels along each 12 inch edge of the panels. The panels are then taped together lengthwise along each 12 inch edge to form a watertight seal along the edges. The shims are 4 mm thick. A similar assembly using bare cold rolled steel is also tested.

As assembly as described above is immersed in each of electrodeposition baths A-E to a depth of 11.3 inches and the assembly serves as the cathode and an anode is also immersed in the bath. A current of between 1.5-1.7 amps is passed between the anode and cathode. The coated panels are then dried. The conditions and results are discussed below.

A comparison between baths A and E and between baths B and E illustrates the difference in throwpower between use of a gamma hydroxy urethane curing agent as produced by capping a polyisocyanate with a 1,3-polyol, as shown in baths A and B having TMPD and NPG capped isocyanates, respectively, and use of a conventional capping agent such as butyl carbitol. The results of this comparison are shown below in Table V-A.

TABLE V-A

Throwpower of Electrodeposition Baths A, B and E

| Bath | Capping Agent | pH | Conductivity (micromhos) | Throwpower at 350 volts and 90° F. (% of 11.3 inches) | | Dry Film Thickness (mils) | Rupture |
|---|---|---|---|---|---|---|---|
| | | | | Phosphated Steel | Bare Steel | | |
| A | TMPD | 5.89 | 1460 | 90 | 73 | 0.91 | no |
| B | NPG | 6.03 | 1763 | 91 | 77 | 0.67 | no |
| E | Butyl Carbitol | 6.32 | 1826 | 78 | 70 | 2.74 | yes |

A comparison between baths C, D, and E illustrates the difference in throwpower between use of a composition including polyisocyanate capped with a 1,3-polyol (TMPD) and with tridecyl alcohol (TDA) and a composition using a butyl carbitol capped polyisocyanate. The results of this comparison are shown below in Table V-B.

TABLE V-B

Throwpower of Electrodeposition Baths B, C and E

| Bath | Capping Agent | pH | Conductivity (micromhos) | Throwpower at 350 volts and 90° F. (% of 11.3 inches) | | Dry Film Thickness (mils) | Rupture |
|---|---|---|---|---|---|---|---|
| | | | | Phosphated Steel | Bare Steel | | |
| C | TMPD + TDA | 6.37 | 1515 | 100 | 83 | 0.86 | no |
| D | TMPD + TDA | 6.41 | 1588 | 87 | 68 | 0.92 | no |
| E | Butyl Carbitol | 6.32 | 1826 | 78 | 70 | 2.74 | yes |

A comparison between baths A and C illustrate the difference in throwpower between use of a composition including a polyisocyanate capped only with a 1,3-polyol (TMPD) and use of a composition including a polyisocyanate capped with both TMPD and TDA. The results of this comparison are shown below in Table 5C.

TABLE 5C

Throwpower of Electrodeposition Baths A and C

| Bath | Capping Agent | pH | Conductivity (micromhos) | Throwpower at 350 volts and 90° F. (% of 11.3 inches) | | Dry Film Thickness (mils) | Rupture |
|---|---|---|---|---|---|---|---|
| | | | | Phosphated Steel | Bare Steel | | |
| A | TMPD | 5.89 | 1460 | 90 | 73 | 0.91 | no |
| C | TMPD + TDA | 6.37 | 1515 | 100 | 83 | 0.86 | no |

Therefore, what is claimed is:

1. An electrodepositable composition, comprising an active hydrogen-containing ionic resin and a gamma hydroxy urethane curing agent which is the reaction product of a polyisocyanate and a blocking agent which is a 1,3-polyol wherein the equivalent ratio of isocyanate groups to hydroxyl groups from the 1,3-polyol is less than 1.

2. The composition of claim 1, in which the equivalent ratio of isocyanate groups to hydroxyl groups from the 1,3-polyol is from 1:1.5 to 2.0.

3. The composition of claim 1, wherein said 1,3-polyol is selected from the group consisting of 2,2,4-trimethylpentane-1,3-diol; 1,3 butanediol; neopentyl glycol; 2-ethyl-2-butyl-1,3-propanediol; and mixtures thereof.

4. The composition of claim 1, wherein said 1,3-polyol is 2,2,4-trimethylpentane-1,3-diol.

5. The composition of claim 1, wherein said active hydrogen-containing ionic resin is a cationic resin.

6. The composition of claim 1, wherein said active hydrogen-containing ionic resin is a cationic resin derived from the group consisting of epoxy polymers, acrylic polymers, polyesters, and mixtures thereof.

7. The composition of claim 1, wherein said curing agent is fully blocked.

8. The composition of claim 1 wherein said curing agent is internal to the active hydrogen-containing ionic resin.

9. The composition of claim 1, wherein said polyisocyanate is an aromatic compound.

10. The composition of claim 1, further comprising an alkyl urethane curing agent.

11. The composition of claim 1, further comprising a curing agent which is the reaction product of a polyisocyanate and a blocking agent which is a fatty alcohol.

12. The composition of claim 11, wherein said fatty alcohol is tridecyl alcohol.

13. The composition of claim 11, wherein the ratio of fatty alcohol-derived curing agent to gamma hydroxy urethane curing agent is from 1:1 to 1:19.

14. An electrodepositable composition, comprising an active hydrogen-containing ionic resin and a curing agent which is the reaction product of a polyisocyanate and a 1,3-polyol wherein the equivalent ratio of isocyanate groups to hydroxyl groups is less than 1.

* * * * *